US008270548B2

(12) United States Patent
Lindoff et al.

(10) Patent No.: US 8,270,548 B2
(45) Date of Patent: Sep. 18, 2012

(54) METHOD FOR DETERMINING SYSTEM INFORMATION, AND DECODER, TERMINAL, AND COMPUTER PROGRAM

(75) Inventors: Bengt Lindoff, Bjärred (SE); Bo Lincoln, Lund (SE); Tobias Rydén, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 820 days.

(21) Appl. No.: 12/361,665

(22) Filed: Jan. 29, 2009

(65) Prior Publication Data

US 2009/0190679 A1   Jul. 30, 2009

Related U.S. Application Data

(60) Provisional application No. 61/024,419, filed on Jan. 29, 2008, provisional application No. 61/052,420, filed on May 12, 2008.

(51) Int. Cl.
*H04B 7/02* (2006.01)
(52) U.S. Cl. ........ 375/347; 375/260; 375/267; 375/296; 375/299
(58) Field of Classification Search ............ 375/260, 375/295, 316, 267, 296, 347
See application file for complete search history.

(56) References Cited

U.S. PATENT DOCUMENTS

| 5,852,630 A * | 12/1998 | Langberg et al. ............. 375/219 |
| 2004/0085892 A1 | 5/2004 | Walton et al. |
| 2008/0232494 A1 * | 9/2008 | Pan et al. ...................... 375/260 |
| 2009/0219838 A1 * | 9/2009 | Jia et al. ........................ 370/278 |

FOREIGN PATENT DOCUMENTS

| WO | WO 2007/106980 A | 9/2007 |
| WO | WO 2008/103317 A2 | 8/2008 |
| WO | WO 2008/115588 A2 | 9/2008 |

OTHER PUBLICATIONS

Motorola : "Proposal for Dedicated Pilots in DownLink Precoding for EUTRA MIMO" 3GPP TSG RAN WG1 Meeting #48, Feb. 12, 2007, St. Louis, pp. 1-5 XP-002494688.

* cited by examiner

*Primary Examiner* — Shuwang Liu
*Assistant Examiner* — David Huang
(74) *Attorney, Agent, or Firm* — Roger S. Burleigh (57) ABSTRACT

A method for a terminal of a cellular telecommunication system for determining system information about a node of a network of the telecommunication system is disclosed. The telecommunication system enables determination of the system information by the terminal from information transmitted from at least one cell operated by the node, where the telecommunication system employs Orthogonal Frequency Division Multiple Access. The method comprises receiving a transmission signal, comprising reference symbols and synchronization symbols, from a network node of the at least one cell; estimating, for each transmit antenna of the network node, a preliminary channel estimate based on the received reference symbols; and estimating a pre-coding vector, being associated with transmission by at least one transmit antenna of the network node of the at least one cell, for the synchronization symbols. Corresponding features for computer program, decoder and terminal are also disclosed.

7 Claims, 5 Drawing Sheets

METHOD FOR DETERMINING SYSTEM INFORMATION, AND DECODER, TERMINAL, AND COMPUTER PROGRAM

CROSS REFERENCE TO RELATED APPLICATIONS

This application claims priority from commonly-assigned U.S. Provisional Patent Application Ser. No. 61/024,419, entitled "Synchronization Signal Antenna Verification" filed on Jan. 29, 2008 and commonly-assigned U.S. Provisional Patent Application Ser. No. 61/052,420, filed on May 12, 2008, entitled "Method for Determining System Information, and Decoder, Terminal, and Computer Program," and also claims priority from European Patent Application, serial number EP08155658.1, filed May 5, 2008; the disclosures of which are incorporated herein by reference.

TECHNICAL FIELD

The present invention relates to a method for determining system information, and a decoder for performing it, a terminal including such a decoder, and a computer program for implementing the method.

BACKGROUND

In the forthcoming evolution of mobile cellular standards like GSM and WCDMA, new transmission techniques like OFDM will be used. Furthermore, in order to have a smooth migration from existing cellular systems to high capacity high data rate systems in existing radio spectrum, new systems must be able to operate in a flexible bandwidth. A proposal for such a new flexible cellular system is 3G Long Term Evolution (3G LTE) that can be seen as an evolution of the 3G WCDMA standard. This system will use OFDM as multiple access technique (called OFDMA) in the downlink and will be able to operate on bandwidths ranging from 1.25 MHz to 20 MHz. Another important aspect of LTE is the mobility function, hence synchronization symbols and cell search procedures are of major importance in order for a terminal operating in the system to detect and synchronize with other cells.

For mobility reasons the terminal needs to read system information from cells, e.g. serving cell and neighbouring cells, prior to handover, in order to collect necessary information as to be able to connect to that other cell. The problem is that the neighbouring cell typically is weaker than the serving cell and hence the detection of broadcast information needs to be done at signal-to-interference ratios (SIRs) below 0 dB. Furthermore, in LTE, reference symbols (RS) are sparse, which makes channel estimation, especially at low SIR, a non-trivial task. This in turn causes the detection of broadcast system information, e.g. the primary broadcast channel (P-BCH), to have quite low performance.

Therefore there is a need for method and apparatus for improving the channel estimates in systems like the LTE to enable acquisition of system information from cells.

SUMMARY

An objective of the invention is therefore to overcome or at least reduce the stated problems. The present invention is based on the understanding that utilising that the synchronization channels can be known to the terminal at the time of doing detection of broadcasted system information, and they can hence be used as additional reference symbols in the channel estimation process, if their pre-coding can be determined. The inventors have found that once the terminal knows the pre-coding used for the synchronization symbol transmission, the information of these can be used for extending the channel model and hence also the use of synchronization symbols in the channel estimation process. Using this, improved channel estimates can be obtained to significantly improve the detector performance, especially when detecting the broadcast system information during the initial cell search procedure in systems like LTE. The present invention thus gives approaches for estimating used pre-coding.

According to a first aspect of the invention, there is provided a method for a terminal of a cellular telecommunication system for determination of information about a node of a network of the telecommunication system, the telecommunication system enabling determination of the information by the terminal from system information transmitted from at least one cell operated by the network node, where the telecommunication system employs Orthogonal Frequency Division Multiple Access, the method comprising receiving a transmission signal, comprising reference symbols and synchronisation symbols, from a network node of the at least one cell; estimating, for each transmit antenna of the network node, a preliminary channel estimate based on the received reference symbols; and estimating a pre-coding vector, being associated with transmission by at least one transmit antenna of the network node of the at least one cell, for the synchronisation symbols.

System information may comprise reference signals, synchronization signals, pre-coding vector, etc.

The method may further comprise re-estimating a channel estimate for each transmit antenna of the network node based on the received reference symbols and the received synchronisation symbols using the estimated pre-coding vector; and decoding the information using the re-estimated at least one channel estimate.

The estimation of the pre-coding vector may comprise estimating an aggregate channel for synchronisation symbols being sent on each transmit antenna using the respective pre-coding vector; and determining the pre-coding vector to be the one best matching a linear combination of the preliminary channel estimates and the pre-coding vector with the aggregate channel estimate.

The determination of the pre-coding vector to be the one best matching may comprise measuring a distance between the linear combination of the preliminary channel estimates and the pre-coding vector, and the aggregate channel estimate. The distance may be calculated by $$\sum_{k=1}^{K} \left| \hat{h}^{(k,SCH)} - \left( a_1 \hat{h}^{(k,1)} + \ldots + a_R \hat{h}^{(k,R)} \right) \right|^2$$

where K is the number of blocks, R is the number of used transmit antennas, $\hat{h}^{(k,SCH)}$ are elements of the aggregate channel estimate, $a_i$, $i=1 \ldots R$, are elements of the pre-coding vector, and $\hat{h}^{(k,j)}$, $j=1 \ldots R$, are elements of the separate channel estimates. A block is a transmitted/received information unit over which channel coefficients are assumed essentially constant.

The estimation of the preliminary channel estimate and estimation of the pre-coding vector may comprise determining a joint log-likelihood of the reference symbols and synchronisation symbols; and maximising the joint log-likelihood of the reference symbols and synchronisation symbols with respect to the separate channel estimates, wherein the pre-coding vector providing the maximal joint log-likelihood of the reference symbols and synchronisation symbols is the estimated pre-coding vector. The joint log-likelihood of the reference symbols and synchronisation symbols may be $$-N\log(\pi\sigma^2) - \frac{1}{\sigma^2}\sum_{r=1}^{R}\sum_{k=1}^{K}\sum_{i=1}^{p^{(r)}}\left|y_i^{(k,r)} - s_i^{(k,r)}h^{(k,r)}e^{jd_i^{(r)}\Delta}\right|^2 -$$

$$\frac{1}{\sigma^2}\sum_{k=1}^{K}\sum_{i=1}^{p^{(SCH)}}\left|y_i^{(k,SCH)} - s_i^{(k,SCH)}\left(\sum_{r=1}^{R}a_r h^{(k,r)}\right)e^{jd_i^{(SCH)}\Delta}\right|^2$$

where N is the total number of symbols, $\sigma^2$ is the variance of additive complex Gaussian noise, K is the number of blocks, R is the number of used transmit antennas, $p^{(r)}$ is the number of symbols from antenna r in each block, $y_i$ is received symbol, $s_i$ is transmitted symbol, $h^{(k,r)}$ are channel coefficients, $d_i^{(r)}$ is relative position between reference symbol i and synchronisation symbol from antenna r, $a_r$ is element of pre-coding vector, and $\Delta$ is frequency error. The maximization of the joint log-likelihood of reference symbols and synchronisation symbols with respect to the separate channel estimates may comprise minimising $$\sum_{r=1}^{R}\sum_{k=1}^{K}\sum_{i=1}^{p^{(r)}}|s_i^{(k,r)}|^2\left|y_i^{(k,r)}/s_i^{(k,r)} \times e^{-jd_i^{(r)}\Delta} - h^{(k,r)}\right|^2 +$$

$$\sum_{k=1}^{K}\sum_{i=1}^{p^{(SCH)}}|s_i^{(k,SCH)}|^2\left|y_i^{(k,SCH)}/s_i^{(k,SCH)}e^{-jd_i^{(SCH)}\Delta} - \sum_{r=1}^{R}a_r h^{(k,r)}\right|^2$$

where K is the number of blocks, R is the number of used transmit antennas, $p^{(r)}$ is number of symbols from antenna r in each block, $y_i$ is received symbol, $s_i$ is transmitted symbol, $h^{(k,r)}$ are channel coefficients, $d_i^{(r)}$ is relative position between reference symbol i and synchronisation symbol from antenna r, $a_r$ is element of pre-coding vector, and $\Delta$ is frequency error.

The method may further comprise estimating a frequency error by optimising a channel estimate function with respect to the frequency error, wherein the optimal frequency error is determined to be the estimated frequency error, such that receiving the transmission signal comprises compensating frequency based on the estimated frequency error. Here, the channel estimate function may comprise $$\sum_{r=1}^{R}\sum_{k=1}^{K}\sum_{i=1}^{p^{(r)}}|s_i^{(k,r)}|^2\left|y_i^{(k,r)}/s_i^{(k,r)} \times e^{-jd_i^{(r)}\Delta} - h^{(k,r)}\right|^2 +$$

$$\sum_{k=1}^{K}\sum_{i=1}^{p^{(SCH)}}|s_i^{(k,SCH)}|^2\left|y_i^{(k,SCH)}/s_i^{(k,SCH)}e^{-jd_i^{(SCH)}\Delta} - \sum_{r=1}^{R}a_r h^{(k,r)}\right|^2$$

The channel estimate function may be optimised with respect to any parameter, or set of parameters, contained thereof.

The method may further comprise estimating a lower bound on the number of transmit antennas used by the network node by determining the highest index of the non-zero elements of the pre-coding vector to be the lower bound.

According to a second aspect, there is provided a computer program comprising computer executable instructions causing a processor, when executed thereon, to perform the method according to the first aspect.

According to a third aspect, there is provided a decoder for a terminal of a cellular telecommunication system in which system information is provided from a network of the telecommunication system, the telecommunication system enabling determination of the system information by the terminal from system information transmitted from at least one cell, where the telecommunication system employs Orthogonal Frequency Division Multiple Access, the decoder comprising a receiver arranged to receive a transmission signal comprising reference symbols and synchronisation symbols from a network node of the at least one cell; a pre-coding vector estimator arranged to estimate a pre-coding vector being associated with transmission by at least one transmit antenna of the network node of the at least one cell, for the synchronisation symbols; and a channel estimator arranged to provide a preliminary channel estimate for each transmit antenna of the network node based on the received reference symbols, and a final channel estimate for each transmit antenna of the network node based on the received reference symbols and the received synchronisation symbols using the estimated pre-coding vector, such that the decoder is enabled to decode the system information using the at least one channel estimate.

The pre-coding vector estimator may be arranged to estimate an aggregate channel for synchronisation symbols being sent on each transmit antenna using the respective pre-coding vector; and determine the pre-coding vector to be the one best matching a linear combination of the separate channel estimates and the pre-coding vector with the aggregate channel estimate.

The pre-coding vector best matching may be the one with a minimum distance between the linear combination of the separate channel estimates and the pre-coding vector and the aggregate channel estimate. The distance may be calculated as $$\sum_{k=1}^{K}\left|\hat{h}^{(k,SCH)} - \left(a_1\hat{h}^{(k,1)} + \ldots + a_R\hat{h}^{(k,R)}\right)\right|^2$$

where K is the number of blocks, R is the number of used transmit antennas, $\hat{h}^{(k,SCH)}$ are elements of the aggregate channel estimate, $a_i$, i=1 . . . R, are elements of the pre-coding vector, and $\hat{h}^{(k,j)}$, j=1 . . . R, are elements of the separate channel estimates.

The pre-coding vector estimator and channel estimator may be arranged to determine a joint log-likelihood of the reference symbols and synchronisation symbols; and maximise the joint log-likelihood of the reference symbols and synchronisation symbols with respect to the preliminary channel estimates, wherein the pre-coding vector providing the maximal joint log-likelihood of reference symbols and synchronisation symbols is the estimated pre-coding vector. The joint log-likelihood of the reference symbols and synchronisation symbols may be $$-N\log(\pi\sigma^2) - \frac{1}{\sigma^2}\sum_{r=1}^{R}\sum_{k=1}^{K}\sum_{i=1}^{p^{(r)}}\left|y_i^{(k,r)} - s_i^{(k,r)}h^{(k,r)}e^{jd_i^{(r)}\Delta}\right|^2 -$$

-continued $$\frac{1}{\sigma^2}\sum_{k=1}^{K}\sum_{i=1}^{p^{(SCH)}}\left|y_i^{(k,SCH)} - s_i^{(k,SCH)}\left(\sum_{r=1}^{R} a_r h^{(k,r)}\right)e^{jd_i^{(SCH)}\Delta}\right|^2$$

where N is the total number of symbols, $\sigma^2$ is the variance of additive complex Gaussian noise, K is the number of blocks, R is the number of used transmit antennas, $p^{(r)}$ is number of symbols from antenna r in each block, $y_i$ is received symbol, $s_i$ is transmitted symbol, $h^{(k,r)}$ are channel coefficients, $d_i^{(r)}$ is relative position between reference symbol i and synchronisation symbol from antenna r, $a_r$ is element of pre-coding vector, and $\Delta$ is frequency error. The maximal joint log-likelihood of reference symbols and synchronisation symbols with respect to the separate channel estimates may be provided by the minimum of $$\sum_{r=1}^{R}\sum_{k=1}^{K}\sum_{i=1}^{p^{(r)}}|s_i^{(k,r)}|^2\left|y_i^{(k,r)}/s_i^{(k,r)}\times e^{-jd_i^{(r)}\Delta} - h^{(k,r)}\right|^2 +$$

$$\sum_{k=1}^{K}\sum_{i=1}^{p^{(SCH)}}|s_i^{(k,SCH)}|^2\left|y_i^{(k,SCH)}/s_i^{(k,SCH)}e^{-jd_i^{(SCH)}\Delta} - \sum_{r=1}^{K} a_r h^{(k,r)}\right|^2$$

where K is the number of blocks, R is the number of used transmit antennas, $p^{(r)}$ is number of symbols from antenna r in each block, $y_i$ is received symbol, $s_i$ is transmitted symbol, $h^{(k,r)}$ are channel coefficients, $d_i^{(r)}$ is relative position between reference symbol i and synchronisation symbol from antenna r, $a_r$ is element of pre-coding vector, and $\Delta$ is a frequency error, wherein the pre-coding vector estimator is arranged to find this minimum.

The decoder may further comprise a frequency error estimator arranged to optimise a channel estimate function with respect to the frequency error, wherein an optimal frequency error is determined to be the estimated frequency error, wherein the estimated frequency error is provided to the receiver such that the receiver is enabled to correct the frequency error. The channel estimate function may be $$\sum_{r=1}^{R}\sum_{k=1}^{K}\sum_{i=1}^{p^{(r)}}|s_i^{(k,r)}|^2\left|y_i^{(k,r)}/s_i^{(k,r)}\times e^{-jd_i^{(r)}\Delta} - h^{(k,r)}\right|^2 +$$

$$\sum_{k=1}^{K}\sum_{i=1}^{p^{(SCH)}}|s_i^{(k,SCH)}|^2\left|y_i^{(k,SCH)}/s_i^{(k,SCH)}e^{-jd_i^{(SCH)}\Delta} - \sum_{r=1}^{R} a_r h^{(k,r)}\right|^2$$

wherein optimisation is performed with respect to $\Delta$.

The decoder may further comprise an estimator for determining a lower bound of the number of transmit antennas used by the network node arranged to determine the highest index of the non-zero elements of the pre-coding vector to be the lower bound.

According to a fourth aspect, there is provided a terminal for a cellular telecommunication system in which system information is provided from a network of the telecommunication system, the telecommunication system enabling determination of the system information by the terminal from system information transmitted from at least one neighbouring cell, where the telecommunication system employs Orthogonal Frequency Division Multiple Access, the terminal comprising a decoder according to the third aspect. The terminal may be arranged to perform handover based on the received system information.

An advantage of an embodiment of the invention is that an improved channel estimate can be provided, which can improve decoding of system information.

An advantage of an embodiment of the invention is that frequency error of the receiver can be estimated such that it can be compensated for.

An advantage of an embodiment of the invention is that a lower bound of the number of transmit antennas used can be estimated.

An advantage of an embodiment of the invention is that handover can be improved because of improved system information reception.

Further advantages will be recognised when reading the detailed description, taking into consideration what is illustrated in the accompanying drawings.

DETAILED DESCRIPTION

Figure 1:
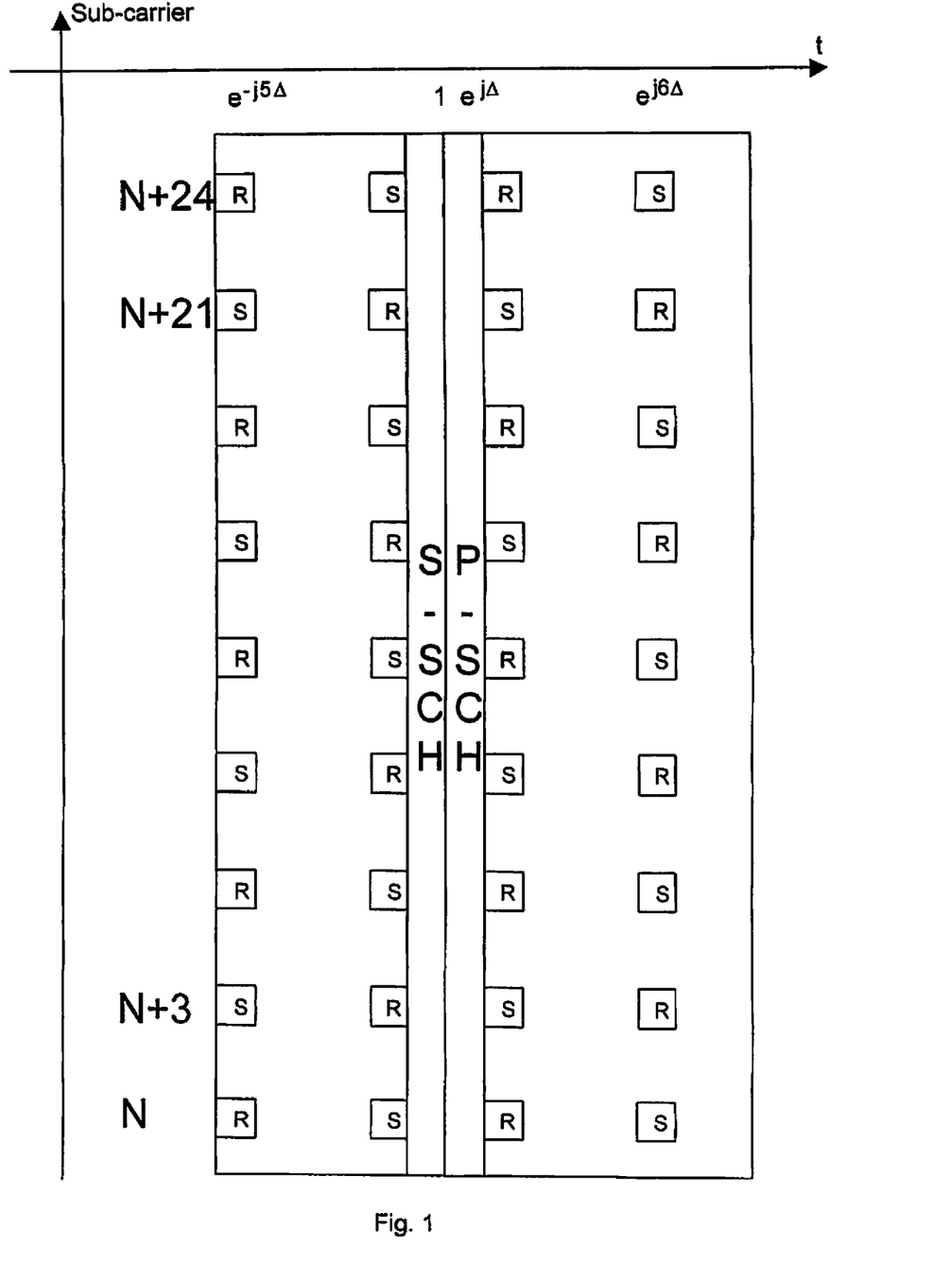
FIG. 1 schematically illustrates an example of transmitted signals used for improved channel estimation.

FIG. 1 schematically illustrates an example of transmitted signals used for improved channel estimation. In detail, FIG. 1 shows a time-frequency pattern for a reference symbol from a first R and potential second antenna S in LTE. In LTE, up to four transmit antennas can be used by the network node. Also synchronisation signals P-SyS and S-SyS, transmitted on middle 62 sub-carriers every 5 ms in sub-frames 0 and 5, are shown in FIG. 1. Once a cell identity is known to the mobile terminal, the P-SyS and S-SyS symbols are also known, and can hence be used as additional reference symbols. A pre-coding scheme for the synchronization signals, i.e. how P-SyS and S-SyS are transmitted from the transmitter antennas of a network node, is employed, at least when multiple transmit (TX) antennas are used by the network node, to avoid degradation of the aggregate transmitted signal.

In the given example, an $i^{th}$ received reference symbol $y_i$ received from the first antenna, which transmitted symbol $r_i$, will be given by $y_i = h_i^1 r_i + e_i$, where $h_i^1$ is the channel from the first antenna to the receiver, and $e_i$ is introduced noise. Similarly, an $i^{th}$ received reference symbol $y_i$ received from the second antenna, which transmitted symbol $s_i$, will be given by $y_i = h_i^2 s_i + e_i$, where $h_i^2$ is the channel from the second antenna to the receiver, and $e_i$ is introduced noise. For the synchronisation symbols, an $i^{th}$ received synchronisation symbol $y_i$ received from the antennas, which transmitted symbol $p_i$, will be given by $y_i = h_i^3 p_i + e_i$, where $h_i^3$ is the channel from the antennas to the receiver, and $e_i$ is introduced noise. Since pre-coding is used for the synchronisation signals transmitted by the two antennas, which each have channels according to what has been demonstrated for the reference symbols above, $$y_i = h_i^3 p_i + e_i = (a_1 h_i^1 + a_2 h_i^2) p_i + e_i$$

where $a_1$ and $a_2$ are the pre-coding for the two transmit antennas.

The idea of the invention is to detect the pre-coding vector A used for transmitting synchronisation symbols, e.g. the primary and secondary synchronisation signals (P-SyS and S-SyS) in LTE, in case that more than one TX antenna is used. The channels are estimated using the reference symbols (RS) transmitted from the respective TX antennas, giving a first and second channel estimate (assuming two TX antennas). Then, according to an embodiment, a third channel estimate can be determined for the P/S-SyS and based on a channel model and the first, second and third channel estimate, the pre-coding used for P/S-SyS is estimated. Alternatively, no explicit estimation of the third channel estimate is made. Instead, a signal model, joint log-likelihood, is applied. Then, for each element in a finite set of pre-coding vectors A, the maximum likelihood $M_i$ is derived. Then the maximum over the finite set of $M_i$ is derived, giving an estimate of the pre coding vector A=(a1,a2, . . . ). Optionally, a frequency error estimate Δ is also determined. Then, an updated first and second channel estimate is determined and the new channel estimates are used for detecting the signal. The optional frequency error estimate Δ can be used for frequency adjustment. In another embodiment of the invention, also a lower bound of the number of TX antennas used by the network node can be estimated.

Using the above proposed pre-coding detection approach makes it possible to improve the channel estimates which in turn improves the detector performance, especially when detecting broadcast system information, e.g. the Primary Broadcast Channel (PBCH) in the initial cell search procedure in LTE.

For the understanding of the principle, a first scheme, in which the channel from each antenna is estimated separately, including also the channel associated with the combined port transmitting the synchronization signals, is considered. Thereafter, based on these estimates, the pre-coding vector of coefficients $a_i$ is estimated by finding the best match of a linear combination of the separately estimated antenna ports to an aggregate estimate of a synchronization signal port.

We assume that the sub-carriers are divided into K blocks of M sub-carriers each. Within each such block, the complex channel coefficients is assumed constant across the sub-carriers and time. We also assume R antennas; in practice R=2 or R=4, since in the case R=1 the synchronization signals must be sent on that single antenna. We introduce the following notation:

$p^{(r)}$: number of reference signals from antenna r in each block $d_i^{(r)}$: position, in units of OFDM symbols, of the $i^{th}$ RS from antenna r, relative to the S-SCH symbol $h^{(k,r)}$: complex channel coefficient at S-SCH symbol in block k, from antenna port r $s_i^{(k,r)}$: value of the $i^{th}$ (transmitted) RS from antenna r in block k $y_i^{(k,r)}$: received signal at the position of $s^{(k,r)}_i$ A=($a_1, a_2, \ldots a_R$): The TX antenna pre-coding vector used for P-SyS and S-SyS.

Also the combined port associated with the synchronization signals can be formulated in this framework, but then the variables refer to synchronization signals rather than reference symbols. We indicate this thought antenna port by writing r=SCH.

Now consider estimation of the channel using reference symbols from antenna r (or synchronization signals when r=SCH). Assuming that each transmitted signal is multiplied by the complex channel coefficient and then disturbed by additive complex Gaussian noise, independent across symbols in frequency and time and with variance $\sigma^2$, the log-likelihood for those reference symbols received from the $i^{th}$ antenna is $$-(Kp^{(r)})\log(\pi\sigma^2) - \frac{1}{\sigma^2}\sum_{k=1}^{K}\sum_{i=1}^{p^{(r)}} \left| y_i^{(k,r)} - s_i^{(k,r)} h^{(k,r)} e^{jd_i^{(r)}\Delta}\right|^2$$

Viewing the frequency error Δ as fixed for a moment, estimation of the channel coefficients $h^{(k,r)}$ thus amounts to minimizing $$QQ^{(r)} = \sum_{k=1}^{K}\sum_{i=1}^{p^{(r)}}\left|y_i^{(k,r)} - s_i^{(k,r)} h^{(k,r)} e^{jd_i^{(r)}\Delta}\right|^2 =$$

$$\sum_{k=1}^{K}\sum_{i=1}^{p^{(r)}} |s_i^{(k,r)}|^2 \left| y_i^{(k,r)}/s_i^{(k,r)} \times e^{-jd_i^{(r)}\Delta} - h^{(k,r)}\right|^2$$

with respect to these coefficients, where overlining denotes complex conjugation. We see that the resulting estimates are given by $$\hat{h}^{(k,r)}(\Delta) = \sum_{i=1}^{p^{(r)}} w_i^{(k,r)} y_i^{(k,r)}/s_i^{(k,r)} \times e^{-jd_i^{(r)}\Delta},$$

where the weights $$w_i^{(k,r)} = |s_i^{(k,r)}|^2 \bigg/ \sum_{i=1}^{p^{(r)}}|s_i^{(k,r)}|^2.$$

Moreover, with $x_i^{(k,r)} = y_i^{(k,r)}/s_i^{(k,r)} \times e^{-jd_i^{(r)}\Delta}$ and $$C^{(k,r)} = \sum_{i=1}^{p^{(r)}}|s_i^{(k,r)}|^2,$$

the minimum of the $k^{th}$ inner sum is given by $$C^{(k,r)}\left(\sum_{i=1}^{p^{(r)}} w_i^{(k,r)} |x_i^{(k,r)}|^2 - \left|\sum_{i=1}^{p^{(r)}} w_i^{(k,r)} x_i^{(k,r)}\right|^2\right).$$

Here the first inner sum does not depend on Δ, so we define $$QQ_{min}^{(r)}(\Delta) = -\sum_{k=1}^{K} C^{(k,r)}\left|\sum_{i=1}^{p^{(r)}} w_i^{(k,r)} y_i^{(k,r)}/s_i^{(k,r)} \times e^{-jd_i^{(r)}\Delta}\right|^2.$$

An estimate of Δ can be found by minimizing the sum of all $QQ^{(r)}_{min}(\Delta)$ over all r, including the synchronization port (r=SCH), with respect to Δ. In general there is no closed-form expression for the minimizer, so that the minimization has to be carried out either by iterative numerical search, or approximately by searching over a finite grid of values. In either case, by inserting the obtained minimum into the above formula for $\hat{h}^{(k,r)}(\Delta)$, a final estimate $\hat{h}^{(k,r)}$ of $h^{(k,r)}$ is obtained.

At this point it can be discriminated between alternatives for the pre-coding vector $A=(a_1, a_2, \ldots a_R)$ by measuring the distance between $a_1\hat{h}^{(k,1)}+ \ldots a_R\hat{h}^{(k,R)}$ and $\hat{h}^{(k,SCH)}$, with superindex SCH indicating the estimate for the thought synchronization signal antenna port. One such distance function is $$\sum_{k=1}^{K} |\hat{h}^{(k,SCH)} - (a_1\hat{h}^{(k,1)} + \ldots + a_R\hat{h}^{(k,R)})|^2$$

There can also be considered weighted versions, for instance with a weight for block k being $|\hat{h}^{(k,1)}|^2 + \ldots + |\hat{h}^{(k,R)}|^2$, so that blocks with larger power are given higher weights.

Finally, after a hard decision about which vector A was used for transmitting the synchronization signals, the procedure can go back and use this decision to carry out a refined channel estimation for each antenna involved in the transmission of synchronization signals.

For further understanding of the principle, in a second scheme we do not, as in the first one, estimate the thought channel over which the synchronization signals are transmitted, but rather estimate all channel coefficients jointly based on all information from reference symbols and synchronization symbols. The joint log-likelihood of all received signals (over all blocks and antennas) is $$-N\log(\pi\sigma^2) - \frac{1}{\sigma^2}\sum_{r=1}^{R}\sum_{k=1}^{K}\sum_{i=1}^{p^{(r)}} |y_i^{(k,r)} - s_i^{(k,r)}h^{(k,r)}e^{jd_i^{(r)}\Delta}|^2 -$$

$$\frac{1}{\sigma^2}\sum_{k=1}^{K}\sum_{i=1}^{p^{(SCH)}} \left|y_i^{(k,SCH)} - s_i^{(k,SCH)}\left(\sum_{r=1}^{R} a_r h^{(k,r)}\right)e^{jd_i^{(SCH)}\Delta}\right|^2$$

where N is the total number of signals (reference symbols and synchronization symbols) involved. Just as for the previous scheme we see that for a fixed pre-coding vector A and a fixed frequency error Δ, maximization of this log-likelihood with respect to the $h^{(k,r)}$ amounts to minimizing $$QQ(\Delta; a) = \sum_{r=1}^{R}\sum_{k=1}^{K}\sum_{i=1}^{p^{(r)}} |y_i^{(k,r)} - s_i^{(k,r)}h^{(k,r)}e^{jd_i^{(r)}\Delta}|^2 +$$

$$\sum_{k=1}^{K}\sum_{i=1}^{p^{(SCH)}} \left|y_i^{(k,SCH)} - s_i^{(k,SCH)}\left(\sum_{r=1}^{R} a_r h^{(k,r)}\right)e^{jd_i^{(SCH)}\Delta}\right|^2 =$$

$$\sum_{r=1}^{R}\sum_{k=1}^{K}\sum_{i=1}^{p^{(r)}} |s_i^{(k,r)}|^2 |y_i^{(k,r)}/s_i^{(k,r)} \times e^{-jd_i^{(r)}\Delta} - h^{(k,r)}|^2 +$$

-continued $$\sum_{k=1}^{K}\sum_{i=1}^{p^{(SCH)}} |s_i^{(k,SCH)}|^2 \left|y_i^{(k,SCH)}/s_i^{(k,SCH)}e^{-jd_i^{(SCH)}\Delta} - \sum_{r=1}^{R} a_r h^{(k,r)}\right|^2$$

This is a quadratic form in the $h^{(k,r)}$, which thus has can be minimized analytically over these variables. Again, optimization over frequency error Δ has to be done numerically, with the result being an estimate of the frequency error Δ, corresponding estimates $\hat{h}^{(k,r)}$, and an optimized loss $QQ_{min}(A)$. The final estimate of A is then the vector in the candidate set providing the smallest $QQ_{min}(A)$. Also, taking a Bayesian perspective with a uniform prior on the finite set of candidate A:s, by computing the numbers $e^{-QQmin(A)}$ for each A and then normalizing these numbers as to sum to unity, we obtain estimates of the posterior probabilities of the respective candidate A.

Just as for the first scheme, there can be performed, after a hard decision of the true vector A, a refinement of the channel estimation for all antennas for which $a_i$ is non-zero.

For any of the embodiments, the approach can also be used for detecting the number of network node TX antennas or at least restricting the number of a hypothesis of the number of network node TX antennas. For example, in LTE, there is currently assumed that the number of network node antennas could be 1, 2 or 4, which—for each detected cell—may need to be blindly detected by the terminal. In a straightforward approach, this can for instance be done by correlating to the reference symbols. The abovementioned invention can also be used for determining a lower bound on the number of TX antennas used in the network node. The highest index i of the estimated non-zero $a_i$ elements of the estimated pre-coding vector A gives an indication of the minimum number of TX antennas used by the network node. This in turn may be used for detecting the number of TX antennas.

Figure 2:
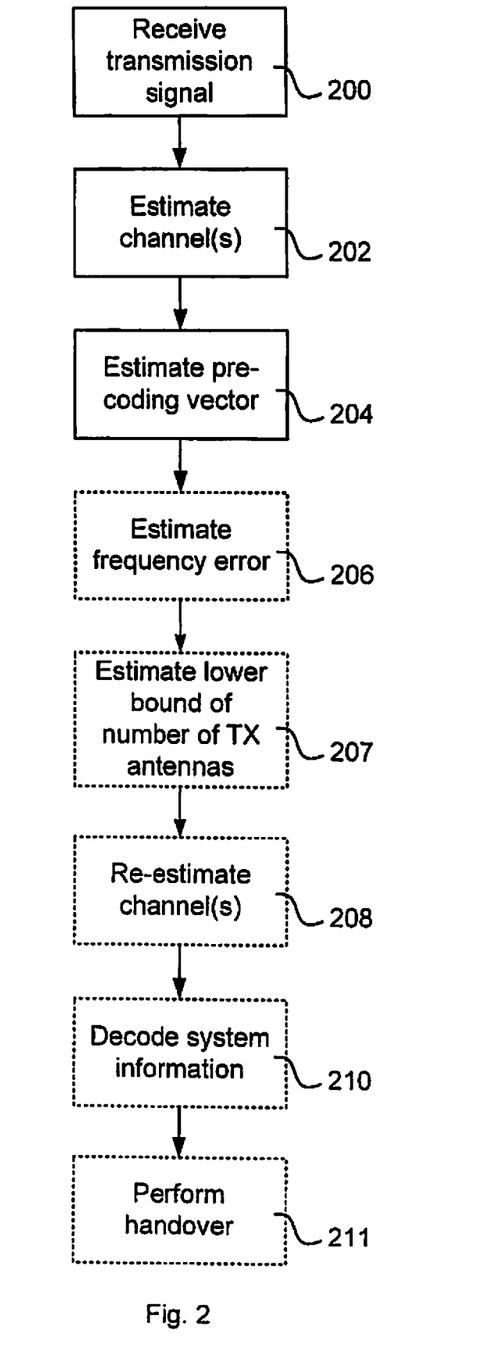
FIG. 2 is a flow chart illustrating a method according to an embodiment of the present invention.

FIG. 2 is a flow chart illustrating a method according to an embodiment of the present invention. In a receiving step 200, a transmission signal, comprising reference symbols and synchronisation symbols e.g. as the example given in FIG. 1, as well as desired system information, e.g. for LTE the PBCH, is received from a network node of a cell. The cell can be the serving cell, any neighbouring cell, or any other cell from which system information is desired. Channels for each transmitting antenna of the network node are estimated using the reference symbols in a channel estimation step 202. To be able to perform the desired operations, corresponding pre-coding vector has to be known, each non-zero pre-coding vector element being associated with transmission by one transmit antenna of the network node of the cell. Therefore, in a pre-coding estimation step 204, the pre-coding vector is determined for the transmission signal, e.g. a broadcast signal on a broadcast channel. This can be done in any way demonstrated above. As also demonstrated above, a frequency error can optionally also be determined in a frequency error estimation step 206, and the estimated frequency error can be used for frequency adjustment in reception of the signals. Further, as also demonstrated above, a lower bound of number of transmit antennas used by the network node can optionally also be determined in a lower bound on the number of transmit antennas estimation step 207. Optionally, when the pre-coding vector is known, and symbols of the transmission signal are received, a channel estimate for all sub-carriers of the received broadcasted signal can be estimated for the estimated pre-coding vector in a channel re-estimating step 208. This is estimated from the received reference symbols and a reference symbol channel model defined for reference symbols of the transmission signal, and from the synchronisation symbols, the at least one pre-coding vector and a synchronisation symbol channel model defined for synchronisation symbols of the transmission signal When the refined channel estimate(s) are present, the desired transmitted system information can be decoded in a system information decoding step 210. Optionally, the acquired system information can be used for performing a handover in a handover performing step 211.

Figure 3:
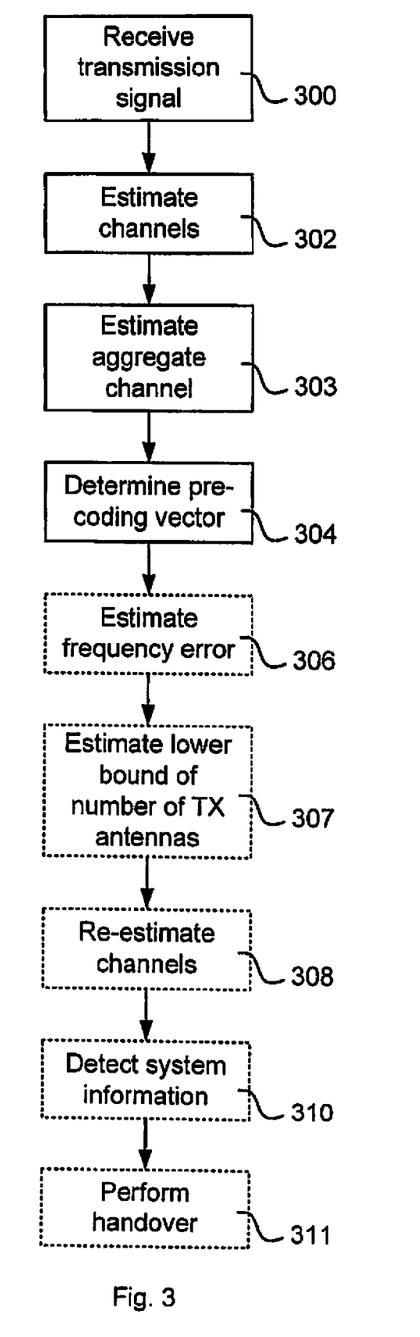
FIG. 3 is a flow chart illustrating a method according to an embodiment of the present invention.

FIG. 3 is a flow chart illustrating a method according to an embodiment of the present invention. In a receiving step 300, a transmission signal, e.g. a broadcast signal on a broadcast channel, comprising reference symbols and synchronisation symbols is received from a network node of a cell, and channels for each transmitting antenna of the network node are estimated using the reference symbols in a channel estimation step 302, similar to the embodiment demonstrated with reference to FIG. 2. The cell can be the serving cell, any neighbouring cell, or any other cell from which system information is desired. In an aggregate channel estimation step 303, an aggregate channel is estimated for the synchronisation symbols that are sent on each used transmit antenna of the network node and to which the pre-coding vector is applied. Then, in a pre-coding vector determination step 304, an estimate of the pre-coding vector is provided by finding a pre-coding vector that best makes a match between on one side a linear combination of the pre-coding vector and the channel estimates from step 302, and on the other side the aggregate channel estimate from step 303. Details for performing this are demonstrated above with reference to the first scheme. As also demonstrated above, a frequency error can optionally also be determined in a frequency error estimation step 306, which frequency error can be used for frequency adjustment in reception of the signals in step 300. Further, as also demonstrated above, a lower bound of number of transmit antennas used by the network node can optionally also be determined in a lower bound of number of transmit antennas estimation step 307. When the pre-coding vector is estimated, the channel estimates are re-estimated for the estimated pre-coding vector in a channel re-estimating step 308, the desired system information decoded in a system information decoding step 310, and optionally performing a handover in a handover performing step 311, similar to the embodiment demonstrated with reference to FIG. 2.

Figure 4:
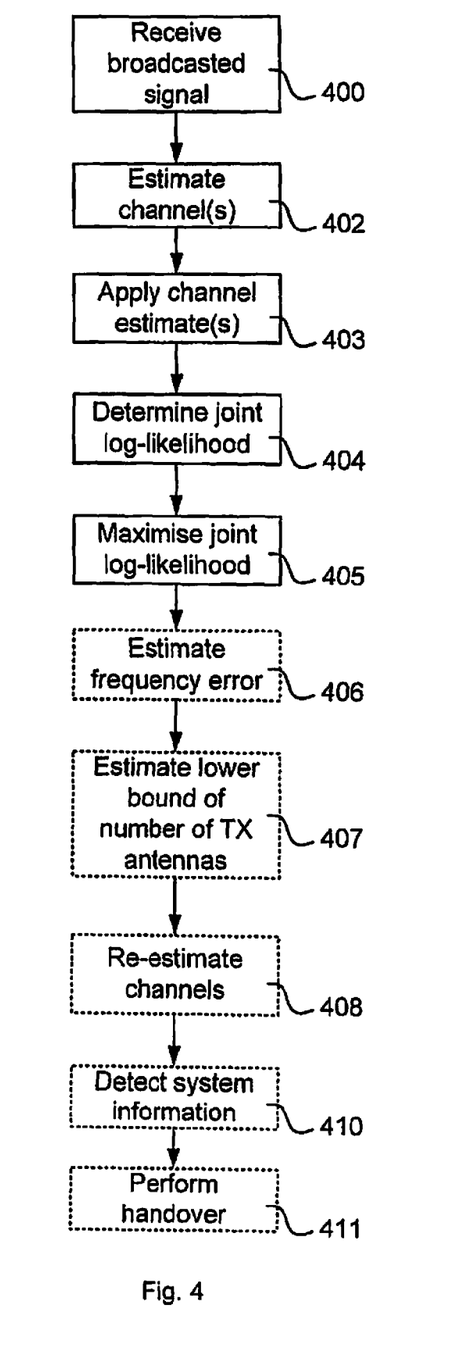
FIG. 4 is a flow chart illustrating a method according to an embodiment of the present invention.

FIG. 4 is a flow chart illustrating a method according to an embodiment of the present invention. In a receiving step 400 a transmission signal, e.g. a broadcast signal on a broadcast channel, comprising reference symbols and synchronisation symbols, is received from a network node of a cell, and channels for each transmitting antenna of the network node are estimated using the reference symbols in a channel estimation step 302, similar to the embodiments demonstrated with reference to FIGS. 2 and 3. The cell can be the serving cell, any neighbouring cell, or any other cell from which system information is desired. However, in this case no explicit estimation of the third channel estimate is made; instead a signal model based on the gained channel estimates is applied in a channel estimates application step 403 and a joint log-likelihood determination step 404. Then, for each element in a finite set of pre-coding vectors, the maximum of the joint log-likelihood is derived, where the maximum over the finite set of derived joint log-likelihoods gives an estimate of the pre-coding vector $A=(a_1, \ldots, a_R)$, in a likelihood maximising step 405, and optionally also a frequency error estimate in a frequency error estimation step 406, which in practice for this embodiment is very much integrated with step 405. The frequency error can be used for frequency adjustment in reception of the signals in step 400. Details for performing these actions are demonstrated above with reference to the second scheme. Further, as also demonstrated above, a lower bound of number of transmit antennas used by the network node can optionally also be determined in a lower bound of number of transmit antennas estimation step 407. This can be performed by observing the highest index i among the non-zero elements of the pre-coding vector. When the pre-coding vector has been estimated, the channel estimates are re-estimated for the estimated pre-coding vector in a channel re-estimating step 408, the desired broadcasted system information decoded in a system information decoding step 410, and optionally performing a handover in a handover performing step 411, similar to the embodiments demonstrated with reference to FIGS. 2 and 3.

Figure 5:
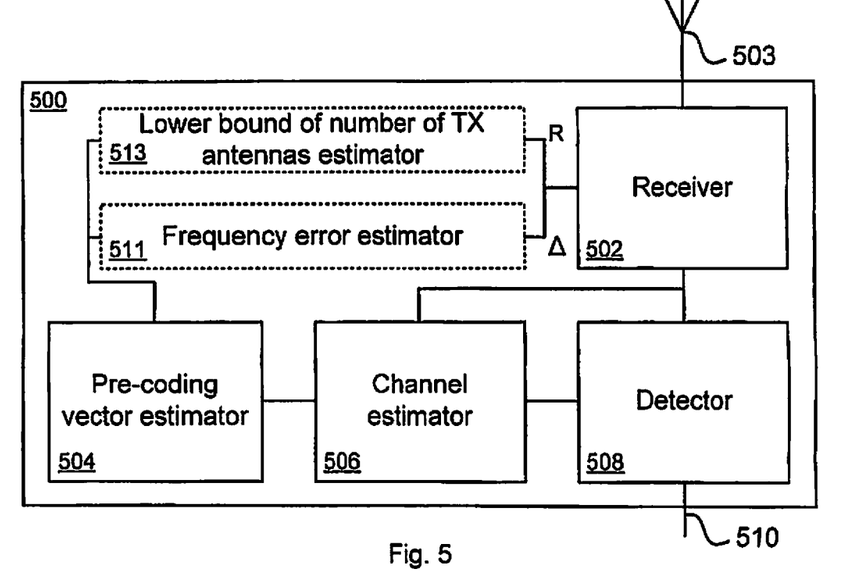
FIG. 5 is a block diagram schematically illustrating a decoder according to an embodiment of the present invention.

FIG. 5 is a block diagram schematically illustrating a decoder 500 according to an embodiment of the present invention. The decoder 500 comprises a receiver 502 that is arranged to receive a transmission signal, e.g. a broadcast signal on a broadcast channel, comprising reference symbols, synchronisation symbols, and system information from a network node of a neighbouring cell. The receiver 502 receives the broadcasted signal via one or more receiver antennas 503. A pre-coding vector estimator 504 is arranged to determine a pre-coding vector being associated with transmission of synchronisation signals from the network node of the at least one cell in the broadcast signal. The cell can be the serving cell, any neighbouring cell, or any other cell from which system information is desired. The pre-coding vector estimator 504 is arranged to gain knowledge of the actually used pre-coding vector as described above with reference to any of FIGS. 1 to 4. A channel estimator 506 is arranged to use received reference symbols to make a preliminary channel estimate for each transmit antenna used by the network node, and use the received reference symbols and the synchronisation symbols, taking the estimated pre-coding vector into account to perform a final channel estimation. This can be performed according to the principles demonstrated above. The received symbols and the channel estimate is provided to a detector 508 such that the decoder 500 is enabled to decode the system information using the at least one channel estimate and provide the decoded system information on its output 510. Optionally, a frequency error estimator 511 of the detector 500 is arranged to estimate a frequency error Δ based on information given by the pre-coding vector estimator 504, wherein the estimated frequency error A can be provided to and used by the receiver 502 to adjust frequency. Also optionally, a lower bound on number of transmit antennas estimator 513 of the detector is arranged to determine the highest number of non-zero elements in the pre-coding vector to be a lower bound on the number of transmit antennas R used by the network node.

Figure 6:
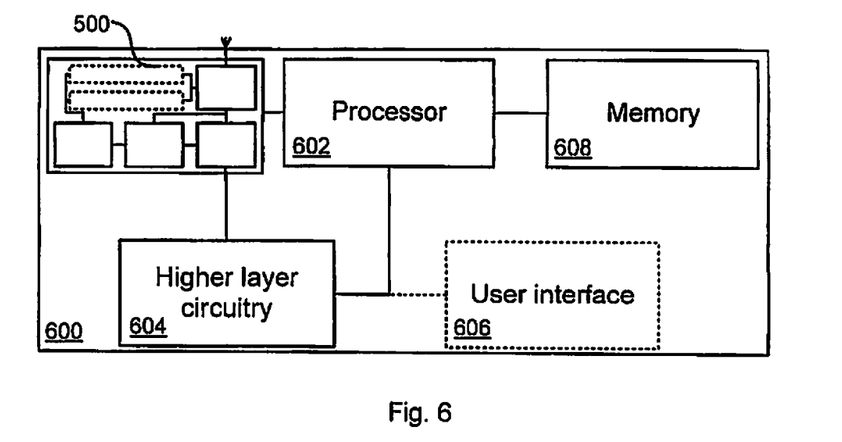
FIG. 6 is a block diagram schematically illustrating a terminal according to an embodiment of the invention.

FIG. 6 is a block diagram schematically illustrating a terminal 600 according to an embodiment of the invention. The terminal 600 comprises a decoder 500 as the one demonstrated with reference to FIG. 5. The terminal preferably also comprises a processor 602 controlling operation of the decoder 500, as well as higher layer circuitry 604 and an optional user interface 606. Preferably, the terminal also comprises a memory 608 connected to the processor.

Figure 7:
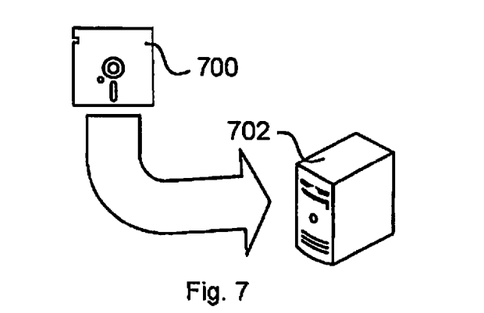
FIG. 7 schematically illustrates a computer readable media comprising a computer program for implementing a method according to any embodiment of the present invention.

The method according to the present invention is suitable for implementation with aid of processing means, such as computers and/or processors, as the operation of OFDM systems highly relies on computerized signal processing in general. Therefore, there is provided computer programs, comprising instructions arranged to cause the processing means, processor, or computer to perform the steps of any of the methods according to any of the embodiments described with reference to any of FIGS. 2 to 4, in a terminal. The computer programs preferably comprises program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to any of FIGS. 2 to 4. The computer 702 and computer program product 700 can be arranged to execute the program code sequentially where actions of the any of the methods are performed stepwise, but mostly be arranged to execute the program code on a real-time basis where actions of any of the methods are performed upon need and availability of data. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

What is claimed is:

1. A method for a terminal of a cellular telecommunication system for determining system information about a node of a network of the telecommunication system, the telecommunication system enabling determination of the system information by the terminal from information transmitted from at least one cell operated by the node, where the telecommunication system employs Orthogonal Frequency Division Multiple Access, the method comprising the steps of:
   receiving a transmission signal, comprising reference symbols and synchronization symbols, from a network node of the at least one cell;
   estimating, for each of a plurality of transmit antennas of the network node, a preliminary channel estimate based on the received reference symbols;
   estimating a pre-coding vector, being associated with transmission by at least one of said antennas of the network node of the at least one cell, for the synchronization symbols; and,
   estimating a lower bound on the number of transmit antennas used by the network node by determining the highest index of non-zero elements of the pre-coding vector to be the lower bound.

2. The method according to claim 1, further comprising the steps of:
   re-estimating a channel estimate for each transmit antenna of the network node based on the received reference symbols and the received synchronization symbols using the estimated pre-coding vector; and
   decoding the information using the re-estimated at least one channel estimate.

3. The method according to claim 1, further comprising the step of estimating a frequency error by optimizing a channel estimate function with respect to the frequency error, wherein the optimal frequency error is determined to be the estimated frequency error, such that receiving the transmission signal comprises compensating frequency based on the estimated frequency error.

4. A method for a terminal of a cellular telecommunication system for determining system information about a node of a network of the telecommunication system, the telecommunication system enabling determination of the system information by the terminal from information transmitted from at least one cell operated by the node, where the telecommunication system employs Orthogonal Frequency Division Multiple Access, the method comprising the steps of:
   receiving a transmission signal, comprising reference symbols and synchronization symbols, from a network node of the at least one cell;
   estimating, for each of a plurality of transmit antennas of the network node, a preliminary channel estimate based on the received reference symbols; and,
   estimating a pre-coding vector, being associated with transmission by at least one of said antennas of the network node of the at least one cell, for the synchronization symbols;
   wherein estimating the preliminary channel estimates and estimating the pre-coding vector further comprises the steps of:
      determining a joint log-likelihood of the reference symbols and synchronisation symbols; and
      maximizing the joint log-likelihood of the reference symbols and synchronization symbols with respect to the separate preliminary channel estimates, wherein the pre-coding vector providing the maximal joint log-likelihood of the reference symbols and synchronization symbols is the estimated pre-coding vector.

5. A decoder for a terminal of a cellular telecommunication system in which system information is provided from a network of the telecommunication system, the telecommunication system enabling determination of the system information by the terminal from system information transmitted from at least one cell, where the telecommunication system employs Orthogonal Frequency Division Multiple Access, the decoder comprising:
   a receiver arranged to receive a transmission signal comprising reference symbols and synchronization symbols from a network node of the at least one cell;
   a pre-coding vector estimator arranged to estimate a pre-coding vector being associated with transmission by at least one of a plurality of transmit antennas of the network node of the at least one cell, for the synchronization symbols;
   a channel estimator arranged to provide a preliminary channel estimate for each of the plurality of transmit antennas of the network node based on the received reference symbols, and a final channel estimate for each transmit antenna of the network node based on the received reference symbols and the received synchronization symbols using the estimated pre-coding vector, such that the decoder is enabled to decode the system information using the final channel estimate; and,
   an estimator for determining a lower bound of the number of transmit antennas used by the network node arranged to determine the highest index of non-zero elements of the pre-coding vector to be the lower bound.

6. The decoder according to claim 5, further comprising a frequency error estimator arranged to optimize a channel estimate function with respect to the frequency error, wherein an optimal frequency error is determined to be the estimated frequency error, wherein the estimated frequency error is provided to the receiver such that the receiver is enabled to correct the frequency error.

7. A decoder for a terminal of a cellular telecommunication system in which system information is provided from a network of the telecommunication system, the telecommunication system enabling determination of the system information by the terminal from system information transmitted from at least one cell, where the telecommunication system employs Orthogonal Frequency Division Multiple Access, the decoder comprising:

a receiver arranged to receive a transmission signal comprising reference symbols and synchronization symbols from a network node of the at least one cell;

a pre-coding vector estimator arranged to estimate a pre-coding vector being associated with transmission by at least one of a plurality of transmit antennas of the network node of the at least one cell, for the synchronization symbols; and, a channel estimator arranged to provide a preliminary channel estimate for each of the plurality of transmit antennas of the network node based on the received reference symbols, and a final channel estimate for each transmit antenna of the network node based on the received reference symbols and the received synchronization symbols using the estimated pre-coding vector, such that the decoder is enabled to decode the system information using the at least one channel estimate;

wherein the pre-coding vector estimator is arranged to:
apply each preliminary channel estimate for received reference symbols and synchronization symbols;

determine a joint log-likelihood of the reference symbols and synchronization symbols; and, maximize the joint log-likelihood of the reference symbols and synchronization symbols with respect to the preliminary channel estimates, wherein the pre-coding vector providing the maximal joint log-likelihood of reference symbols and synchronization symbols is the estimated pre-coding vector.

* * * * *

UNITED STATES PATENT AND TRADEMARK OFFICE
CERTIFICATE OF CORRECTION

PATENT NO. : 8,270,548 B2
APPLICATION NO. : 12/361665
DATED : September 18, 2012
INVENTOR(S) : Lindoff et al.

Page 1 of 1

It is certified that error appears in the above-identified patent and that said Letters Patent is hereby corrected as shown below:

In Column 5, Line 25, delete " $\sum_{r=1}^{K}$ " and insert -- $\sum_{r=1}^{R}$ --, therefor.

In Column 8, Line 7, delete "$i^{th}$" and insert -- $r^{th}$ --, therefor.

Signed and Sealed this
Twenty-sixth Day of February, 2013

Teresa Stanek Rea
*Acting Director of the United States Patent and Trademark Office*